United States Patent [19]

Lemieux et al.

[11] 4,197,395

[45] Apr. 8, 1980

[54] CROSSLINKING OF MERCAPTAN CONTAINING POLYMERS WITH POLYALDEHYDE COMPOUNDS

[75] Inventors: Raymond U. Lemieux; Rastko Vukov, both of Edmonton, Canada

[73] Assignee: Polysar Limited, Sarnia, Canada

[21] Appl. No.: 890,507

[22] Filed: Mar. 27, 1978

Related U.S. Application Data

[62] Division of Ser. No. 568,381, Apr. 15, 1975, Pat. No. 4,100,137.

[30] Foreign Application Priority Data

May 30, 1974 [CA] Canada .................................... 201213

[51] Int. Cl.$^2$ ............................................... C08G 2/38

[52] U.S. Cl. .................................... 528/205; 528/128; 528/154; 528/230; 528/245; 528/374; 528/381; 525/326; 525/329; 525/333; 525/334; 525/385

[58] Field of Search ............... 528/205, 381, 374, 245, 528/128, 154, 230, 273; 526/13, 16, 20, 21, 55

[56] References Cited

U.S. PATENT DOCUMENTS

| | | | |
|---|---|---|---|
| 3,597,313 | 8/1971 | Williams et al. | 162/167 |
| 3,872,000 | 3/1975 | Hamada et al. | 210/54 |

Primary Examiner—Lester L. Lee
Attorney, Agent, or Firm—Stevens, Davis, Miller & Mosher

[57] ABSTRACT

A process, and the composition therefrom, is provided for crosslinking of polymers containing hydroxy or mercaptan groups by reaction with polyaldehyde compounds, the crosslinks being thermally labile.

10 Claims, No Drawings

CROSSLINKING OF MERCAPTAN CONTAINING POLYMERS WITH POLYALDEHYDE COMPOUNDS

This is a Division of application Ser. No. 568,381 filed Apr. 15, 1975 and now U.S. Pat. No. 4,100,137.

This invention is directed to novel crosslinked elastomeric compositions and to methods of preparing such compositions.

The crosslinking of hydroxy group containing and mercaptan group containing polymers can be achieved by a limited number of methods known in the art. Such methods include reaction of the hydroxy group with isocyanate compounds and a limited number of amine or imine group containing compounds; the dominant method is the reaction with polyisocyanate compounds. Mercaptan containing polymers are usually crosslinked by reaction with oxidizing agents such as lead dioxide or zinc peroxide.

It has now been discovered that hydroxy group containing and mercaptan group containing polymers can be crosslinked by reaction with certain polyaldehyde compounds to yield crosslinked products. As used herein, the term crosslink refers to a chemical bridge which connects a reactive site on one polymer molecule with a reactive site on another polymer molecule.

It has also been discovered that such crosslinked products possess a thermoplastic character in that, on heating, the crosslinks dissociate and, on cooling, crosslinks reform so that the product regains its original character.

It is an objective of this invention to provide a novel process for the crosslinking of hydroxy group containing and mercaptan group containing polymers by reaction with polyaldehyde compounds.

It is a further objective of this invention to provide novel crosslinked materials having the property that, on heating, the crosslinks dissociate and, on cooling, the crosslinks are reformed.

Hydroxyl group containing polymers are well known in the art. They include hydrocarbon main chain polymers as exemplified by isobutylene-conjugated diolefin copolymers chemically modified along the chain to have hydroxyl groups attached thereto, butadiene polymers containing essentially terminal hydroxy groups, polymers of styrene, butadiene and 2-hydroxy ethyl acrylate and polymers of alkyl acrylates and 2-hydroxy ethyl acrylate. Also included are the polyester diols generally derived from the reaction of a dicarboxylic acid with a diol and having terminal hydroxyl groups. Liquid or rubbery poly(oxyalkylene) glycols, also known as polyalkylene glycols, and derived from the polymerization of alkylene oxides wherein the alkylene group is selected from ethylene and propylene are also included as hydroxyl group containing polymers.

Mercaptan group containing polymers are exemplified by the conjugated diolefin homo- and co-polymers and the polysulphide rubbers containing terminal mercaptan groups which are well known in the art.

Such hydroxy group containing and mercaptan group containing polymers can be obtained in a wide range of viscosity average molecular weights, from about 1,000 up to about 500,000. Polymers with molecular weights up to about 10,000 are generally flowable at room temperature, while those with molecular weights from about 10,000 to about 50,000 are viscous materials and those with molecular weights above about 50,000 to about 500,000 or more are normally rubbery at room temperature. All such molecular weight ranges are contemplated as within the scope of suitable polymers for use in this invention.

The polyaldehyde compounds used to crosslink the polymers are of the general form $$[(H_2O)_a \cdot OHC\text{-}C(X)]_n\text{-}R\text{-}C(Y)\text{-}CHO \cdot (H_2O)_a$$

in which R is an organic group comprising one or more aromatic rings or an aliphatic group having not less than three carbon atoms one of which is quaternary, n is 1 or 2, X and Y are the same and are selected from oxygen and di(methoxy) and a is 0 or 1.

Preferred polyaldehyde compounds are those where n is 1, i.e. dialdehyde compounds. Preferred X and Y groups are when both are oxygen. When R is an aliphatic group, preferably it contains not more than 10 carbon atoms, the carbon atom joining the rest of the molecule being quaternary.

Exemplary compounds when X and Y are both oxygen and n is 1 include o- and p- diglyoxalyl benzene where R is a single aromatic group, 4,4'-diglyoxalyl biphenyl where R is 2 aromatic groups and 4,4'-diglyoxalyl biphenyl ether where R is 2 aromatic groups joined through oxygen. When X and Y are both oxygen and n is 2, a suitable compound is 1,3,5-triglyoxalyl benzene. When X and Y are both di(methoxy), a suitable compound is 4,4'-bis(dimethoxy formyl methyl) biphenyl ether. An example of a suitable compound when R is an aliphatic group and n is 1 is 2,2-diglyoxalyl propane. The aforesaid exemplary compounds may also contain water of hydration associated with each aldehyde group.

For the process of this invention, it is necessary that the polymer contain an average of at least 1.8 hydroxyl groups or mercaptan groups per polymer molecule. If the hydroxyl or mercaptan group content is below an average of at least 1.8 it is not possible to obtain satisfactory crosslinking. The hydroxyl group polymer may contain more than an average of 1.8 hydroxyl groups per polymer molecule, particularly if the hydroxyl groups are distributed along the polymer chain. The polymer may contain up to about 25 hydroxyl groups per 100 monomer units combined into the backbone. A preferred hydroxyl group containing polymer is one which contains at least two hydroxyl groups, which groups may be distributed along the polymer chain or may be essentially terminal and optionally in combination with additional groups distributed along the chain. A preferred mercaptan group containing polymer contains essentially two mercaptan groups in essentially terminal positions.

The amount of the polyaldehyde compound to be reacted with the hydroxyl group or mercaptan group polymer is at least about 0.05 molar equivalent in aldehyde groups to the hydroxyl group or mercaptan group content of the polymer. The actual amount used will depend on the particular properties required in the crosslinked product, but will not be more than about 2 molar equivalent. The preferred polyaldehyde is a dialdehyde compound which is difunctional in aldehyde groups and the molar equivalent thereof is thus one half of the molecular weight based on a 1 to 1 reaction of the aldehyde group with the hydroxyl or mercaptan groups of the polymer. Preferably the amount of dialdehyde compound is from 0.7 to 1.5 molar equivalent to the hydroxyl or mercaptan group content of the polymer.

The polymer-aldehyde compound may be mixed by any of the conventional methods. If the polymer is flowable at room temperature, it may be mixed with the aldehyde compound on a three-roll paint mill, by simple stirring type mixing or it may be mixed in solution. If the polymer is viscous or rubbery at room temperature it may be mixed with the aldehyde compound in any conventional rubber mixing equipment including 2-roll rubber mills, Banbury mixers or mixing extruders and it may also be mixed with the aldehyde compound in solution. The temperatures used for mixing will be from room temperature up to about 200° C. If the aldehyde compound is anhydrous, the mixing temperature will be from about 100° to about 200° C.; if the aldehyde compound is hydrated, the mixing temperature will be from room temperature up to about 200° C., the lower temperature being usable because crosslinks are not formed.

The mixed polymer-aldehyde compound may contain additives conventionally used in rubber compounding. Such additives include fillers such as the carbon blacks, the particulate mineral fillers, including clay, chalk, silica, silicates, metal oxides and the like and the fibrous fillers such as asbestos fibres, glass fibres and the like. Process oils or plasticizers may also be present; the selection of the type of oil or plasticizer will depend on the chemical nature of the polymer and is well known to one skilled in the art. The additives may include stabilizing compounds such as antioxidants and antiozonants. Pigments or colouring agents may also be incorporated into the mixture.

The crosslinked polymer may be molded by heating to a temperature of about 100°-200° and on cooling to ambient temperatures the crosslinks reform. If the aldehyde compound is in the hydrated form it is necessary to heat the mixture sufficiently to remove the water, thereby permitting the aldehyde groups to react with the hydroxy or mercaptan groups. The mixture is heated to between about 100° C. and about 200° C., preferably between 125° and 175° C. On cooling of the mixture to ambient temperature, the product attains its crosslinked character.

The cooled crosslinked material may be reheated to a temperature of about 100° C. to about 200° C., and reshaped while hot. On cooling again to ambient temperature it regains its crosslinked nature. The reheating and cooling cycle can be repeated many times without apparently affecting the flowability of the material at high temperature or the crosslinked nature of the material at ambient temperature. By virtue of this capability, shaping of the product may be achieved either during the first heating cycle or during any subsequent heating cycle. Scrap material from the shaping operation can be readily reworked without significant effect on the properties of the product so obtained.

The novel products of this invention can be used in a wide range of end-use applications depending on the molecular weight of the polymer and on the number of crosslinks introduced in the crosslinked product.

When the molecular weight of the hydroxy or mercaptan group containing polymer is below about 10,000, the polymer being generally flowable at room temperature, the crosslinked product may be used in sealant, hot-melt adhesive or encapsulating formulations. Such formulations are spreadable or gunnable pastes or pourable liquids at elevated temperatures, and are elastomeric at ambient temperatures. Such formulations may also contain, in addition to the conventional additives, tackifiers and solvents. Use of the products of this invention in such applications has the advantage that, due to their flowability at high temperatures, solvents may be eliminated if desired while still obtaining the necessary flow and, due to the attainment of the crosslinked character on cooling, that the applied formulation rapidly attains its elastomeric properties. Polymers suitable for this end-use application desirably contain at least about 1.8 hydroxy or mercaptan groups per polymer molecule. It is preferred that the hydroxy or mercaptan groups are located at or near the ends of the polymer molecules. Additional groups may be distributed along the chains but the number of hydroxy or mercaptan groups is preferably not more than about 3 per polymer molecule.

For crosslinked products derived from hydroxy or mercaptan group containing polymers having molecular weights from about 10,000 to about 50,000, end-uses include adhesives and sealants. Compositions for these uses are spreadable or gunnable pastes at elevated temperatures and are elastomeric at ambient temperatures. For polymers of this molecular weight range the hydroxy or mercaptan groups may be randomly distributed along the polymer molecules or may be located at or near the ends of the polymer molecules. The polymers desirably contain at least about 1.8(2) hydroxy or mercaptan groups per polymer molecule and preferably not more than about 3(6) such groups per polymer molecule.

When the molecular weight of the hydroxy or mercaptan polymers is above about 50,000 the products obtained by reaction with a polyaldehyde are of two distinct types. A first type of product is that having a low concentration of crosslinks sufficient only to impart to the product the property of green strength. Green strength is a measure of the strength of rubber compositions. Many types of synthetic rubbers, for example copolymers containing major proportions of polymerized butadiene or isobutylene, become excessively soft and weak in the unvulcanized state when compounded with large amounts of oils or plasticizers. Such compounds, if they could be handled in commercial operations, could be converted to perfectly satisfactory vulcanizates and may be of especial cost advantage. However, they cannot be handled in commercial operations due to the lack of green strength. By the process of this invention, products may be prepared having low concentrations of thermally dissociable crosslinks which impart green strength to the products—they may then be mixed, milled, sheeted or extruded at elevated temperatures when the crosslinks may be dissociated but on cooling the crosslinks reform and generate sufficient green strength for the products to be handled by conventional methods, even when the products contain higher than normal levels of oils or plasticizers. The polymer desirably contains hydroxy or mercaptan groups randomly distributed along the chain at a concentration of at least about 1.8 groups per polymer molecule. The preferred polyaldehyde is a dialdehyde and is reacted with the hydroxy or mercaptan polymer at molar ratio of aldehyde groups to hydroxy or mercaptan groups of from at least about 0.05 and sufficient to create a molecular weight between the green strength crosslinks of about 50,000 to about 150,000. The crosslinked improved green strength product so obtained is then compounded with conventional ingredients, including peroxide or sulphur vulcanizing agents, and vulcanized in the normal manner—the presence of the small concentration of thermally dissociable crosslinks for green strength does not affect to a significant extent the properties of the vulcanizate.

The second type of product which may be obtained by reacting polymers having molecular weights above about 50,000 with polyaldehydes has strength properties comparable with conventional vulcanizates at ambient temperatures and may be used in the majority of conventional end uses. These products may also be reprocessed and reshaped by heating to temperatures sufficient to cause dissociation of the crosslinks. Hence, these products belong to the class of materials known as thermoplastic rubbers. The polymers used to make these crosslinked products contain from about 10(6) to about 25 hydroxy or mercaptan groups per polymer molecule. The amount of polyaldehyde reacted with the polymer is such that the molar ratio of aldehyde groups to hydroxy or mercaptan groups is from about 0.5 to about 2 and preferably from 0.7 to 1.5 and sufficient to create a molecular weight between the crosslinks of about 5,000 to about 30,000.

EXAMPLE 1

A butadiene-styrene-hydroxyethyl acrylate polymer was prepared by conventional free radical emulsion polymerization techniques using a mixed fatty acid - rosin acid soap, a ferrous-formaldehyde-sulfoxalate activator, an organic hydroperoxide catalyst and a thiocarbamate shortstop. The polymerization temperature was 5° C. One part by weight of hydroxyethyl acrylate was present initially, a further one part was added at 20% conversion and a further one part was added at 40% conversion. The polymerization was stopped at 62% conversion after 6.5 hours polymerization time. The recovered polymer contained about 2.9 weight percent of hydroxyethyl acrylate and had a Mooney (ML-4 at 100° C.) of about 60.

100 parts by weight of this polymer was mixed on a rubber mill with 1.5 parts by weight of a phenolic antioxidant and with 3 parts by weight of the dihydrate of 4,4'-diglyoxalyl biphenyl ether crosslinking agent. The rubber mill was maintained at room temperature for the mixing. The mixture retained the properties of the original polymer. A sample of the mixture was placed, between sheets of Teflon, in a mold at a temperature of 175° C. for about 15 seconds following which it was cooled to room temperature. The mixture had now become a coherent rubbery sheet having good elastic properties. The sheet was reheated to 175° C., reshaped and cooled at least ten times and the properties of the sheet were found not to have changed each time when checked at room temperature. This shows the thermal remoldability of the rubbery material.

EXAMPLE 2

Using the polymer of Example 1, the compositions of Table I were prepared and tested. The compositions were prepared by mixing, at room temperature, on a rubber mill. The compositions so formed showed no evidence of rubbery properties. The compositions were molded into sheets and heated at 175° C. for about fifteen seconds followed by cooling to room temperature. The sheets so produced were elastomeric and could be remolded readily at 175° C. A sample of each sheet was immersed in benzene at room temperature for 48 hours and the swelling ratio (weight of benzene swollen sample divided by weight of sample after removal of benzene) was determined, the results being given in Table I. The swelling ratios show that the sheets were crosslinked. 100 parts by weight of each composition of Table I were combined to form a composite sample which was remolded at 175° C. into a sheet 6 inch×6 inch×0.03 inch and the sheet was cooled to room temperature. The stress-strain properties were determined for this composite sample at various test temperatures as shown in Table I. The results show the thermoplastic nature of the crosslinked composite sample.

TABLE I

| Experiment # | | (a) | (b) | (c) |
|---|---|---|---|---|
| Polymer | pts. by wt. | 100 | 100 | 100 |
| Antioxidant | " | 1.5 | 1.5 | 1.5 |
| Carbon black (HAF) | " | 50 | 50 | 50 |
| Dihydrate of 4,4'-diglyoxalyl biphenyl ether | " | 2.5 | 3.0 | 3.5 |
| Swelling ratio Composite sample | | 7.8 | 8.4 | 10.4 |

| Test Temp. °C. | Tensile Strength Kg/cm$^2$ | Elongation % | 100% Modulus Kg/cm$^2$ |
|---|---|---|---|
| Room (25) | 200 | 330 | 45 |
| 40 | 165 | 310 | 45 |
| 60 | 114 | 290 | 36 |
| 80 | 59 | 260 | 22 |
| 100 | 31 | 290 | 18 |
| 120 | 17 | 240 | 13 |

EXAMPLE 3

100 parts by weight of a liquid polysulphide polymer was mixed at room temperature on a rubber mill with 10 parts by weight of the dihydrate of diglyoxalyl biphenyl ether. The polysulphide polymer is commercially available and is described as a mercaptan terminated bis-2-chloroethyl formal-based polymer containing 2% of copolymerized trichloropropane crosslinking agent and having a molecular weight of $M_n=4000$. The mixture was heated in an oven at 150° C. for 5 minutes. On cooling to room temperature the product was an elastomeric solid. On reheating to 180° C. the product became liquid and on cooling returned to its elastomeric solid state. The reheating-cooling cycle was repeated several times with no apparent effect on the elastomeric nature of the solid product. A control experiment involving the heating and cooling of the polysulphide polymer in the complete absence of the diglyoxalyl biphenyl ether only yielded the original liquid polymer. A sample of the elastomeric solid was immersed in boiling water for 30 minutes and, on cooling, was found to have retained its elastomeric properties.

TABLE II

| Experiment # | 1 | 2 | 3 | 4 |
|---|---|---|---|---|
| Polymer Type | BUT | BD | AC | ED |
| Amount of polymer (parts by weight) | 100 | 100 | 100 | 100 |
| Dihydrate of 4,4'-diglyoxalyl biphenyl ether (parts by weight) | 2 | 12.7 | 4.5 | 17 |
| Heating temperature °C. | 175 | 160 | 150 | 150 |

EXAMPLE 4

Samples of various polymers containing hydroxy groups were reacted with the dihydrate of 4,4'-diglyoxalyl biphenyl ether. The polymers used were a hydroxylated butyl rubber having a Mooney (ML 8 at 100° C.) of about 40 and about 1–2 hydroxy groups per 100 g of polymer (BUT polymer in Table II), a hydroxy liquid polybutadiene having a bulk viscosity of about 50 poise at 30° C. and an equivalent weight of about 1250 (BD polymer in Table II), a liquid ethyl acrylate-hydroxyethyl acrylate polymer prepared by conventional free radical emulsion polymerization techniques and containing about 3 parts by weight of hydroxyethyl acrylate and about 97 parts by weight of ethyl acrylate (AC polymer in Table II), and a viscous fluid polyester diol derived from adipic acid and a glycol having a hydroxyl number of 69 and a bulk viscosity of about 150 poise at 25° C. (ED polymer in Table II). The mixtures of Table II were prepared either on a rubber mill or by hand mixing on a glass plate. The mixtures were placed between sheets of Teflon and heated in a press at the temperatures shown in Table II. On cooling to room temperature all the materials had elastomeric properties and could be remolded by heating to the temperatures specified.

The AC polymer of Experiment 3 was mixed on a glass plate in the following recipe:

|  | Pts. by Wt. |
|---|---|
| Polymer | 100 |
| Dioctyl phthalate | 30 |
| Silica (fine particle size) (Cab-O-Sil HS-5, Trademark) | 10 |
| Titanium dioxide | 3 |
| Dihydrate of 4,4'-diglyoxalyl biphenyl ether | 4.5 |

On heating to 150° C., the mixture was thoroughly mixed and was a soft, easily spread paste. On cooling to room temperature the product was tack-free in about six minutes and by thirty minutes had formed a solid elastomeric material.

TABLE III

| Experiment # | 1 | 2 | 3 | 4 | 5 |
|---|---|---|---|---|---|
| Polymer (pts. by wt.) | 100 | 100 | 100 | 100 | 100 |
| Type of Crosslinking Compound* | A | B | C | D | E |
| Amount of Crosslinking Compound | 3 | 3 | 3 | 3 | 3 |
| Cure | No | Yes | Yes | Yes | Yes |

*Crosslinking compounds:
A 4,4'-diacetyl biphenyl ether
B 4,4'-diglyoxalyl benzene dihydrate
C 4,4'-bis-biphenyl glyoxal dihydrate
D 2,2'-diglyoxalyl propane dihydrate
E 1,3,5-triglyoxalyl benzene trihydrate

EXAMPLE 5

The polymer identified as AC polymer in Example 4 was crosslinked with other suitable aldehyde compounds. The aldehyde compounds used in Table III include, as a control, 4,4'-diacetyl biphenyl ether which shows no crosslinking activity, 4,4'-diglyoxalyl benzene dihydrate, 4,4'-bis-biphenyl glyoxal dihydrate, 2,2'-diglyoxalyl propane dihydrate and 1,3,5 triglyoxalyl benzene trihydrate. The mixtures were prepared on a glass plate and heated between Teflon sheets in an oven at 150° C. followed by cooling to room temperature. Only the diacetyl biphenyl ether treated polymer was not crosslinked on cooling to room temperature. The crosslinked polymers were remoldable at 150° C.

EXAMPLE 6

A hydroxylated liquid polybutadiene containing 0.18 moles of hydroxyl groups per 100 grams of polymer (100 parts by weight) was mixed with 4,4'-bis-(dimethoxyformylmethyl) biphenyl ether dihydrate (11.5 parts by weight) and heated to 170°–180° C. for ten minutes. On cooling to room temperature, the crosslinked material was found to be elastomeric.

EXAMPLE 7

A polymer was prepared and evaluated for improved green strength utilizing the crosslinking method of this invention. The polymer contained styrene, butadiene and 2-hydroxyethyl acrylate in an approximate weight ratio of 69:29:1.7 and had a Mooney (ML 1+4 at 100° C.) of 111. Using a small scale two-roll rubber mill, a compound was prepared using the recipe of Table IV, following which the compound was divided into two essentially equal portions. Portion A was put back onto the rubber mill with the rolls maintained at 105° C. and the equivalent of 1 millimole of diglyoxalyl diphenyl ether dihydrate per 100 g of polymer in the compound was rapidly added and mixed into the compound over a total time of 1 minute, the resultant mixture then being sheeted off the mill. Portion B (control) of the compound was milled on the 105° C. rubber mill for 1 minute but no additive was incorporated. The portions A and B were formed into sheets of 1 inch by 4 inch by 0.075 inch by moulding for 5 minutes at 105° C. The stress-strain properties of these compositions were determined as a measure of the green strength, the results being given in Table IV. Clearly, the compound reacted with diglyoxalyl diphenyl ether has developed good green strength when compared with the control compound.

Following this, sheets were prepared having dimensions of 1 inch by 2.5 inch by 0.03 inch and these were vulcanized by heating for 50 minutes at 145° C. Stress-strain properties for these vulcanizates, where the vulcanization has occurred by means of a conventional sulphur system, are shown in Table IV and it is clear that the portion reacted with diglyoxalyl diphenyl ether to cause the development of green strength shows vulcanizate properties equivalent to the control portion.

This Example shows that the green strength of an elastomer can be improved by the process of this invention and such an improved green strength compound can be vulcanized using conventional vulcanizing agents. By this means it is possible to control factory processing properties without adverse effect on vulcanizate properties.

TABLE IV

| Compound Composition | parts by weight |
|---|---|
| Polymer | 100 |
| Carbon black (HAF) | 50 |
| Zinc oxide | 3 |
| Stearic acid | 1 |
| N-tert-butyl-2-benzothiazole sulphenamide | 1 |
| Sulphur | 1.75 |

| Green Strength Properties | | Portion A | Portion B (Control) |
|---|---|---|---|
| Elongation | % | 480 | 450 |
| Tensile strength | Kg/cm$^2$ | 27 | 5 |
| Modulus at 100% | Kg/cm$^2$ | 7.5 | 6 |
| 200% | Kg/cm$^2$ | 12.5 | 6 |
| 300% | Kg/cm$^2$ | 20 | 7 |

| Vulcanizate Properties | | Portion A | Portion B (Control) |
|---|---|---|---|
| Tensile strength | Kg/cm$^2$ | 265 | 270 |
| Elongation | % | 310 | 350 |
| Modulus at 100% | Kg/cm$^2$ | 45 | 35 |

TABLE IV-continued

| 300% | Kg/cm² | 245 | 220 |

What is claimed is:

1. A process for crosslinking polymers containing an average of at least 1.8 mercaptan groups per polymer molecule which comprises mixing a polymer having a molecular weight of from about 1,000 to about 500,000 with a polyaldehyde compound of general form $$[(H_2O)_a \cdot OHC \cdot C(X)]_n \text{-R-C(Y)-CHO} \cdot (H_2O)_a$$

wherein R is an organic group comprising one or more aromatic rings or an aliphatic group having not less than three carbon atoms one of which is quaternary, X and Y are the same and are selected from oxygen and di(methoxy), n is 1 or 2 and a is 0 or 1, said mixing being at a temperature of from about room temperature to about 200° C., wherein the amount of said polyaldehyde compound is at least about 0.05 under equivalent but not more than about 2 molar equivalent to the mercaptan group content of the polymer, shaping the mixture at a temperature of about 100° C. to about 200° C. and cooling the shaped mixture to yield the crosslinked polymer.

2. The process of claim 1 in which a is 1 and the polymer and polyaldehyde are mixed at from about room temperature to about 200° C.

3. The process of claim 1 in which a is 0 and the polymer and polyaldehyde are mixed at from about 100° to about 200° C.

4. The process of claim 1 wherein the polyaldehyde is selected from O- or p-diglyoxalyl benzene, 4,4'-diglyoxalyl biphenyl, 4,4'-diglyoxalyl biphenyl ether, 1,3,5-triglyoxalyl benzene, 4,4'-bis(dimethoxy formylmethyl) biphenyl ether and 2,2-diglyoxalyl propane.

5. The process of claim 1 in which the polyaldehyde is a dialdehyde, the amount of which is from 0.7 to 1.5 molar equivalent to the mercaptan group content of the polymer.

6. The process of claim 5 in which the polyaldehyde is diglyoxalyl biphenyl ether dihydrate.

7. The process of claim 6 in which the mercaptan group polymer is a mercaptan terminated bis-2-chloroethyl formal polymer.

8. A crosslinked composition comprising the reaction product of a polymer containing an average of at least 1.8 mercaptan groups per polymer molecule and a polyaldehyde compound of general form $$[(H_2O)_a \cdot OHC \cdot C(X)]_n \text{-R-C(Y)-CHO} \cdot (H_2O)_a$$

wherein R is an organic group comprising one or more aromatic rings or an aliphatic group having not less than three carbon atoms one of which is quaternary, X and Y are the same and are selected from oxygen and di(methoxy), n is 1 or 2 and a is 0 or 1, said polymer having a molecular weight of from about 1,000 to about 500,000; the amount of said polyaldehyde being at least about 0.05 but not more than about 2 molar equivalent to the mercaptan group content of the polymer, said polymer and said polyaldehyde being mixed at a temperature of from about room temperature to about 200° C., the mixture being shaped at a temperature of about 100° to about 200° C. and the shaped mixture being cooled to yield the crosslinked composition.

9. The crosslinked composition of claim 8 wherein the mercaptan group polymer contains two mercaptan groups in terminal positions.

10. The crosslinked composition of claim 8 wherein the molar ratio of aldehyde groups to mercaptan groups is from about 0.5 to about 2.